United States Patent
Chen

(10) Patent No.: US 11,940,129 B2
(45) Date of Patent: Mar. 26, 2024

(54) FIREPROOF PANEL LIGHT

(71) Applicant: Ningbo Dongxing Electric Co., Ltd., Cixi (CN)

(72) Inventor: Wei Chen, Cixi (CN)

(73) Assignee: Ningbo Dongxing Electric Co., Ltd., Ningbo (CN)

( * ) Notice: Subject to any disclaimer, the term of this patent is extended or adjusted under 35 U.S.C. 154(b) by 0 days.

(21) Appl. No.: 18/302,779

(22) Filed: Apr. 18, 2023

(65) Prior Publication Data
US 2023/0341110 A1    Oct. 26, 2023

(30) Foreign Application Priority Data
Apr. 26, 2022   (CN) .......................... 202221012790.1

(51) Int. Cl.
| | | |
|---|---|---|
| F21V 15/01 | (2006.01) | |
| C09K 21/00 | (2006.01) | |
| F21S 8/04 | (2006.01) | |
| F21V 23/00 | (2015.01) | |

(52) U.S. Cl.
CPC .............. *F21V 15/01* (2013.01); *C09K 21/00* (2013.01); *F21S 8/043* (2013.01); *F21V 23/001* (2013.01)

(58) Field of Classification Search
CPC ........... F21V 15/01; C09K 21/00; F21S 8/043
See application file for complete search history.

(56) References Cited

U.S. PATENT DOCUMENTS

| | | | | |
|---|---|---|---|---|
| 7,651,238 B2* | 1/2010 | O'Brien | ................. | F21V 29/15 |
| | | | | 362/147 |
| 7,652,590 B2* | 1/2010 | Lin | ......................... | G08B 5/36 |
| | | | | 340/815.45 |
| 8,333,490 B2* | 12/2012 | Wu | ........................ | F21V 25/12 |
| | | | | 362/147 |
| 9,982,855 B1* | 5/2018 | Tan | ........................ | F21V 21/28 |
| 10,125,934 B1* | 11/2018 | Zhang | ..................... | F21V 29/89 |
| 2008/0158862 A1* | 7/2008 | Wu | ............................ | F21S 8/02 |
| | | | | 362/365 |
| 2016/0003428 A1* | 1/2016 | Anderson | ................. | F21S 4/26 |
| | | | | 362/147 |

* cited by examiner

*Primary Examiner* — Bryon T Gyllstrom
(74) *Attorney, Agent, or Firm* — Wang Law Firm, Inc.

(57) ABSTRACT

A fireproof panel light comprises a panel light housing having a wire hole for a wire to pass through and a fireproof pressure plate covering the wire hole disposed on the panel light housing; wherein, the fireproof pressure plate has a passage for receiving the wire, the passage extends from the wire hole outward to the edge of the fireproof pressure plate. The wire hole can be covered by using the fireproof pressure plate, the flame is prevented from fleeing outward from the wire hole, and the fire prevention effect at the wire hole is realized. And the extension direction of the passage on the fireproof pressure plate can further improve the fire prevention effect.

7 Claims, 2 Drawing Sheets

FIREPROOF PANEL LIGHT

TECHNICAL FIELD OF THE INVENTION

The present invention relates to the field of panel lights, and in particular to a fireproof panel light.

BACKGROUND OF THE INVENTION

Panel lights are widely used for accent lighting in shopping malls, large supermarkets, offices, museums, exhibition halls, hotels, high-grade residences, etc., and can brighten the environment and also beautify the environment, thereby adding color to life. Fireproofing of panel lights is an important index. After searching, a Chinese patent CN209782342U (patent No.: 201920556397.0) titled "Downlights" and a Chinese patent CN208703672U (patent No.: 201820201018.1) titled "A Downlight" were found. All components of the panel lights disclosed in the above two patents are made of fireproof materials, avoiding the fire disaster caused by fire occurring inside the panel lights. While the panel light needs an external power box, the light emitting component inside the panel light will extend out of the housing to be connected to a wire, and a wire hole will be disposed on the housing corresponding to the position of the wire. However, no additional fire prevention measures are made at the wire hole in the existing panel lights. As a result, when there is a fire occurred inside the panel light, the flame may flee from the wire hole, resulting in a fire risk.

SUMMARY OF THE INVENTION

It is an object of the present invention to provide a fire rated panel light which can prevent flame from fleeing outside through the wire hole.

For achieving the above object, a fireproof panel light comprises a panel light housing having a wire hole for a wire to pass through and a fireproof pressure plate covering the wire hole disposed on the panel light housing; wherein, the fireproof pressure plate has a passage for receiving the wire, the passage extends from the wire hole outward to the edge of the fireproof pressure plate.

Preferably, to simplify the structure, at least one portion of top of the fireproof pressure plate is arched up to form the passage at the bottom of the fireproof pressure plate.

To realize the rapid mounting of the fireproof pressure plate, preferably, the fireproof pressure plate has a first end where the passage located, and a second end away from the passage; the fireproof pressure plate has a plurality of pins located at the second end of the fireproof pressure plate, and the panel light housing has a plurality of clamping holes, each clamping hole receiving one pin; the first end of the fireproof pressure plate is attached to the panel light housing through a fastener.

To further improve the fireproof performance, preferably, the fireproof pressure plate is disposed on the panel light housing covering the top of the wire hole, and a fireproof piece is disposed on the panel light housing for covering the bottom of the wire hole.

To further ensure the attachment of the fireproof pressure plate to the panel light housing, minimize the mounting gap between the fireproof pressure plate and the panel light housing and the wire, and improve the fireproof reliability, preferably, the wire hole is located on the top surface of the panel light housing and further comprises a first portion and a second portion in communication with the first portion; the first portion is matched with the cross-section of the wire, and the size of the second portion is greater than that of the first portion; a flexible clamping sheet attached to the panel light housing is located inside the second portion of the wire hole, and the flexible clamping sheet has a free end capable of bending relative to the panel light housing.

To ensure the clamping degree of the wire, avoiding the displacement of the fixed wire and avoiding the mounting gap as far as possible and further improving the fireproof reliability, preferably, the free end of the clamping sheet extends to the junction of the first portion and the second portion.

To facilitate the deformation of the clamping sheet and the mounting of the wire in the wire hole, preferably, a gap is defined between each side of the clamping sheet and the edge of the second portion of the wire hole.

Preferably, the wire hole is in T-shaped.

Compared with the prior art, the present invention has the following advantages: the wire can be positioned and the wire hole can be covered under the design of the fireproof pressure plate; In addition, the fireproof pressure plate can be fitted with the panel light housing and the wire, therefore the gap is minimized, and the flame is prevented from fleeing from the wire hole, and the fire prevention effect at the wire hole is realized. Besides, the passage extends from the wire hole outward to the edge of the fireproof pressure plate, that is, the extension direction from the wire hole is changed. Even if a tiny flame flees from the wire hole, the flame can be prevented from further fleeing due to the suppression of the fireproof pressure plate, thereby achieving a better fireproof effect. Moreover, compared with fixing and occluding the wire hole by only one sealing element and fixing the wire on one side of the wire hole by using a buckle in the prior art, the structure for fixing the wire is simpler and more convenient to assemble, and can effectively reduce the overall thickness of the panel light and improve the aesthetic appearance of the panel light.

DETAILED DESCRIPTION OF THE INVENTION

The present invention will be further described below in detail by embodiments with reference to the accompanying drawings.

Figure 1:
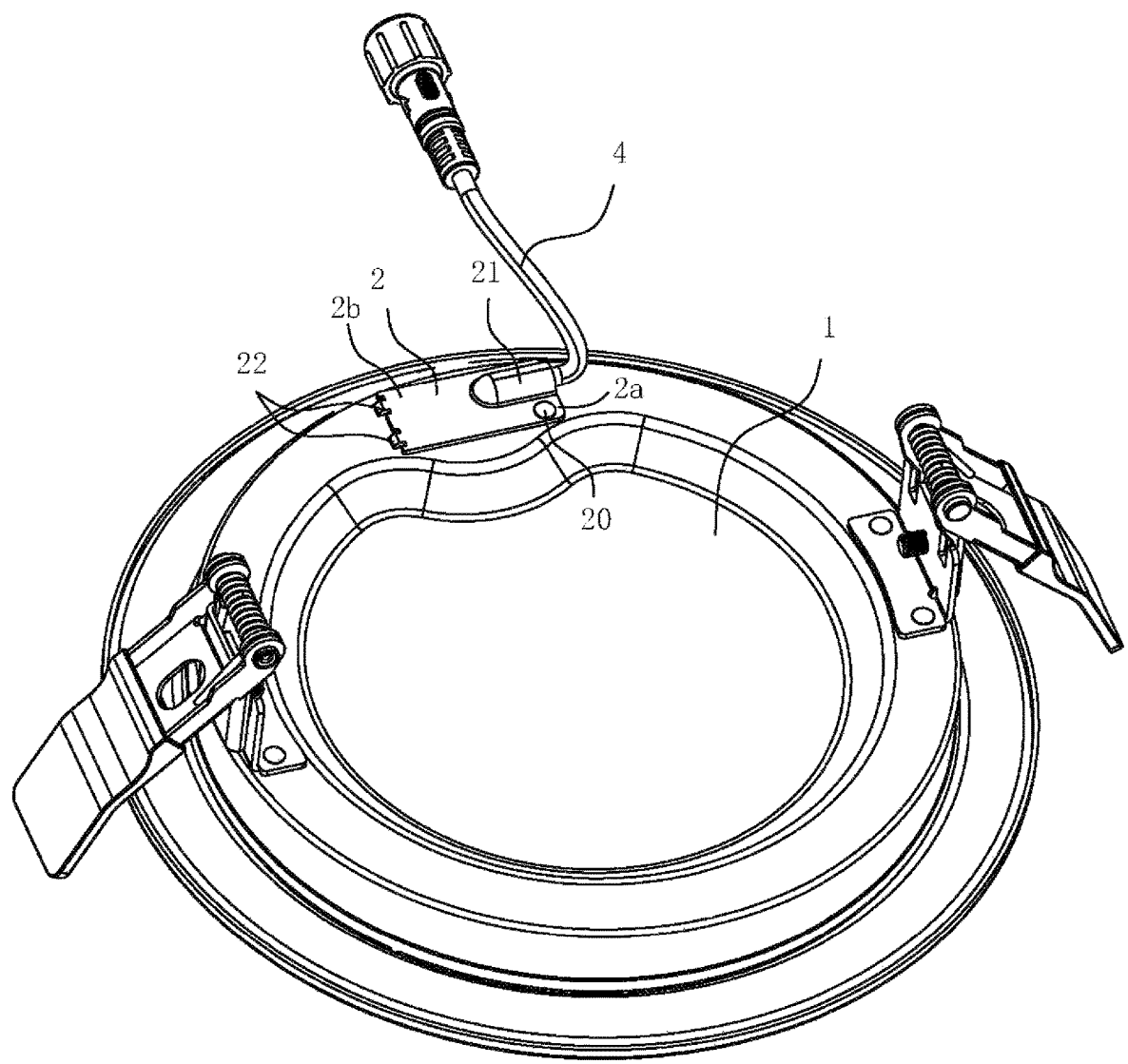
FIG. 1 is a perspective view of a fireproof panel light according to the embodiment of the present invention.
Figure 2:
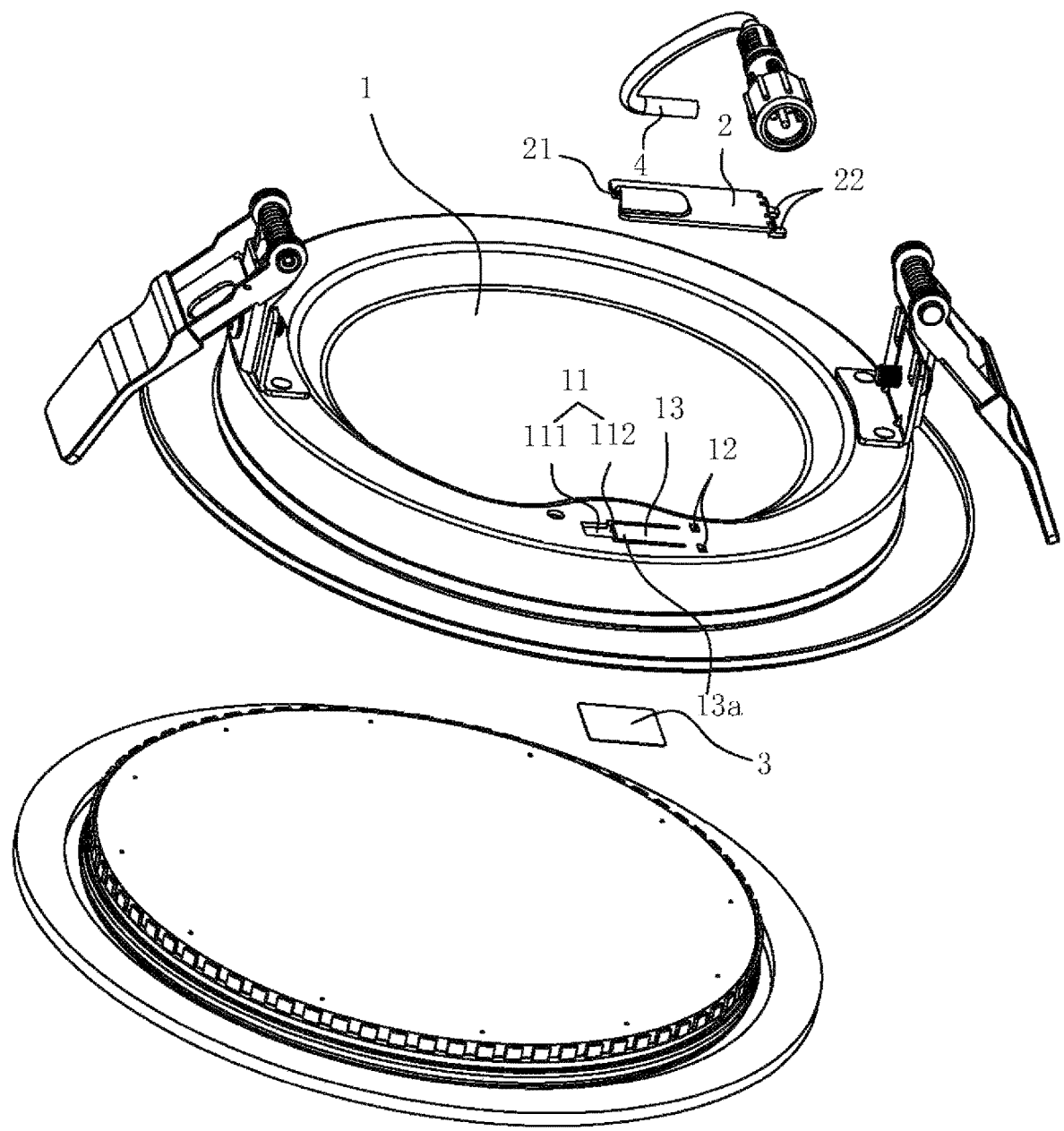
FIG. 2 is an exploded view of the fireproof panel light according to the embodiment of the present invention.

FIG. 1 and FIG. 2 show a preferred Embodiment of the fireproof panel light of the present invention. The fireproof panel light comprises a panel light housing 1 and a fireproof pressure plate 2.

The panel light housing 1 has a wire hole 11, and a wire 4 for connecting a light-emitting component inside the panel light housing 1 can extend outside through the wire hole 11 to be electrically connected to an external terminal box. The fireproof pressure plate 2 covering the wire hole 11 is disposed on the panel light housing 1 and has a passage 21 for receiving the wire 4. Since the commonly used fireproof pressure plate 2 has a limited thickness, in the embodiment, one portion of top of the fireproof pressure plate 2 is arched up to form the passage 21 at the bottom of the fireproof pressure plate 2. The passage 21 extends from the wire hole 11 outward to the edge of the fireproof pressure plate 2. After the wire 4 extends out from the panel light housing 1 through the wire hole 11, the wire 4 is placed inside the passage 21 of the fireproof pressure plate 2, so that the wire 4 is limited between the fireproof pressure plate 2 and the panel light housing 1 and tightly sticks with the both. In this way, there is almost no gap between the wire 4 and the fireproof pressure plate 2, and between the wire 4 and the panel light housing 1, therefore the flame is prevented from fleeing outside through the wire hole 11 when the flame appears inside the panel light housing 1, and the fire prevention effect at the wire hole 11 is achieved. In addition, as the passage 21 extends from the wire hole 11 outward to the edge of the fireproof pressure plate 2, the passage direction from the wire hole is changed. Even if a tiny flame flees from the wire hole, the flame can be prevented from further fleeing due to the suppression of the fireproof pressure plate, thereby achieving a better fireproof effect. Moreover, compared with occluding the wire hole by only one sealing element, and limiting the wire on one side of the wire hole by using a buckle in the prior art, the structure in the embodiment for limiting the wire is simpler and more convenient to assemble, and can effectively reduce the overall thickness of the panel light and improve the aesthetic appearance of the panel light.

To realize the rapid mounting of the fireproof pressure plate 2, the fireproof pressure plate 2 has a plurality of pins 22 located at the second end 2b away from the passage 21 of the fireproof pressure plate 2. The pins 22 have an L-shaped cross-section and completely go down toward the second end 2b of the fireproof pressure plate 2. The panel light housing 1 has a plurality of clamping holes 12, each clamping hole receiving one pin 22; the first end 2a of the fireproof pressure plate 2 is attached to the panel light housing 1 through a fastener 20. During mounting, pins 22 at the second end 2b of the fireproof pressure plate 2 insert into the clamping holes 12, and the first end 2a of the fireproof pressure plate 2 is then fixed to the panel light housing 1 through the fastener 20, so that the mounting of the fireproof pressure plate 2 on the panel light housing 1 is rapidly realized and it is also easy to mount and operate.

The wire 4 in the panel light usually has a mounting portion at its fixed position. To protect the wire 4 and avoid the damage to the insulating skin outside the wire 4 caused by mounting, the insulating skin at the mounting portion of the wire 4 is thickened.

In this embodiment, the wire hole 11 is located on the top surface of the panel light housing 1 and further comprises a first portion 111 and a second portion 112 in communication with the first portion 111.

The first portion 111 is matched with the cross-section of the wire 4, and the size of the second portion 112 is greater than that of the first portion 111; a flexible clamping sheet 13 attached to the panel light housing 1 is located inside the second portion 112 of the wire hole 11, and the flexible clamping sheet 13 has a free end 13a capable of bending relative to the panel light housing 1. Based on the specific shapes of the first portion 111 and the second portion 112, the size of the first portion 111 and the size of the second portion 112 refer to different parameters, respectively. For example, when the first portion 111 and the second portion 112 are circular, the size of the first portion 111 and the size of the second portion 112 refer to diameter, respectively. If the first portion 111 and the second portion 112 are rectangular, the size of the first portion 111 and the size of the second portion 112 include length and width, the length of the corresponding second portion 112 is greater than that of the first portion 111, and the width of the second portion 112 is greater than that of the second portion 112. When the first portion 111 is rectangular and the second portion 112 is circular, the size of the first portion 111 refers to the diagonal length of the rectangle, and the size of the second portion 112 refers to the diameter. The size of the second portion 112 is always greater than that of the first portion 111, that is, the second portion 112 can cover the first portion 111 in plane. In this embodiment, the wire hole 11 is in T-shaped, that is, the length and width of the first portion 111 corresponds to the length and the width of the second portion 112.

To facilitate the bending of the clamping sheet 13 for many times and reset the clamping sheet 13 effectively after being bent, in this embodiment, the panel light housing 1 is a metal g with a fireproof function. Based on the size of the second portion 112 and the size of the first portion 111, the wire 4 can easily insert into the second portion 112 of the wire hole 11 and then be clamped into the first portion 111 of the wire hole 11. The free end 13a of the clamping sheet 13 extends to the junction of the first portion 111 and the second portion 112, so that the clamping sheet 3 can be squeezed and placed into the sidewall of the mounting portion of the wire 4 in the first portion 111, thereby fixing the wire 4 in the first portion 111 of the wire hole 11. A gap is defined between each side of the clamping sheet 13 and the edge of the second portion 112 of the wire hole 11, accordingly, it is convenient to pick up the clamping sheet 13 and it is convenient for the bending operation of the clamping sheet 13.

During mounting, the clamping sheet 13 is bent upward to vacate the second portion 112. Since the size of the second portion 112 is greater than that of the first portion 111, the end of the wire 4 can easily insert into the second portion 112. Then, the clamping slots on the mounting portion of the wire 4 are aligned with the plates on two sides of the first portion 111 of the wire hole 11, and the wire 4 is moved into the first portion 111 of the wire hole 11, so that the mounting portion of the wire 4 is clamped into the first portion 111 of the wire hole 11 and the clamping slots are clamped at the plates on two sides of the first portion 111, thereby effectively preventing the wire 42 from sliding up and down. Then, the clamping sheet 13 is pressed down to make the clamping sheet 13 be placed in the second portion 112 of the wire hole 11 and located in the same plane as the top surface of the panel light housing 1. At this time, the end of the clamping sheet 13 is resisted against the other side face of the mounting portion of the wire 4, and the mounting portion of the wire 4 is effectively limited in the first portion 111.

Then, a fireproof piece 3 is disposed on the panel light housing 1 for covering the bottom of the wire hole 11. The fireproof piece 3 is fixed to the lamp housing 1 in the various existing fixation ways. In this embodiment, the fireproof piece 3 covers not only the full region of the wire hole 1, but also the positions of the pins 22 of the fireproof pressure plate 2, so that the fire prevention in regions where the wire 4 appears is realized as far as possible.

Based on the fixation of the wire 4 by the wire hole 11, the wire 4 can be effectively fixed at the position of the wire hole 11, and the structure for fixing the wire 4 will not protrude from the top surface of the panel light housing 1, so that the attachment of the fireproof pressure plate 2 to the panel light housing 1 is further ensured, the mounting gap between the fireproof pressure plate 2 and the panel light housing 1 and the wire 4 is minimized, and the fireproof reliability is further improved.

It should be noted that in this specification and Claims of the present invention, the terms "front, back", "up, down", "left, right", "side, top, bottom", etc. to describe each particular structure and component are used for the purpose of facilitating the description of the invention and are based on a particular orientation in attached drawings. Since the embodiments disclosed by the present invention can be set in different directions, these terms indicating directions are only used as explanations and should not be used as restrictions. For example, the verbs "up", "down" should not be limited to the direction opposite or consistent with the gravity.

The invention claimed is:

1. A fireproof panel light, comprising:
a panel light housing having a wire hole for a wire to pass through;
a fireproof pressure plate covering the wire hole disposed on the panel light housing;
wherein,
the fireproof pressure plate has a first end with a passage for receiving the wire, a second end away from the passage, and a plurality of pins located at the second end of the fireproof pressure plate, and the panel light housing has a plurality of clamping holes, each clamping hole receiving one pin,
the passage extends from the wire hole outward to an edge of the fireproof pressure plate, and
the first end of the fireproof pressure plate is attached to the panel light housing through a fastener.

2. The fireproof panel light of claim 1, wherein at least one portion of a top of the fireproof pressure plate is arched up to form the passage at a bottom of the fireproof pressure plate.

3. The fireproof panel light of claim 1, wherein the fireproof pressure plate is disposed on the panel light housing covering a top of the wire hole, and a fireproof piece is disposed on the panel light housing for covering a bottom of the wire hole.

4. The fireproof panel light of claim 1, wherein the wire hole is located on a top surface of the panel light housing and further comprises a first portion and a second portion in communication with the first portion;

the first portion matches a cross-section of the wire, and a size of the second portion is greater than a size of the first portion;

a flexible clamping sheet attached to the panel light housing is located inside the second portion of the wire hole, and the flexible clamping sheet has a free end capable of bending relative to the panel light housing.

5. The fireproof panel light of claim 4, wherein the free end of the clamping sheet extends to a junction of the first portion and the second portion.

6. The fireproof panel light of claim 4, wherein a gap is defined between each side of the clamping sheet and an edge of the second portion of the wire hole.

7. The fireproof panel light of claim 4, wherein the wire hole is T-shaped.

* * * * *